(12) United States Patent
Czapar (10) Patent No.: US 11,904,801 B2
(45) Date of Patent: Feb. 20, 2024

(54) SEATBELT BUCKLE DETECTION

(71) Applicant: GM Cruise Holdings LLC, San Francisco, CA (US)

(72) Inventor: Matthew George Czapar, Larkspur, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 197 days.

(21) Appl. No.: 17/552,426

(22) Filed: Dec. 16, 2021

(65) Prior Publication Data
US 2023/0192029 A1 Jun. 22, 2023

(51) Int. Cl.
*B60R 22/48* (2006.01)
*G06V 20/59* (2022.01)
*G06N 20/00* (2019.01)

(52) U.S. Cl.
CPC ............. *B60R 22/48* (2013.01); *G06N 20/00* (2019.01); *G06V 20/59* (2022.01); *B60R 2022/4808* (2013.01)

(58) Field of Classification Search
CPC ............ B60R 22/48; B60R 2022/4808; B60R 2022/4816; B60R 2022/4825; G06N 20/00; G06V 20/59
See application file for complete search history.

(56) References Cited

U.S. PATENT DOCUMENTS

| 2019/0168710 A1* | 6/2019 | Liau ................... B60R 21/01532 |
| 2020/0320318 A1* | 10/2020 | Ramaglia ............... B60Q 3/242 |
| 2021/0394710 A1* | 12/2021 | Hu ........................ B60W 40/09 |

* cited by examiner

*Primary Examiner* — Joseph H Feild
*Assistant Examiner* — Sharmin Akhter
(74) *Attorney, Agent, or Firm* — Novak Druce Carroll LLP (57) ABSTRACT

The subject disclosure relates to techniques for detecting proper use of a seatbelt in a vehicle. A process of the disclosed technology can include steps for receiving, from a sensor, image data of one or more portions of a seatbelt. The process can further include steps for determining a length of the seatbelt that is dispensed based on the image data and determining if the seatbelt is buckled in front of a passenger's body based on the length of the seatbelt that is dispensed. Systems and machine-readable media are also provided.

20 Claims, 5 Drawing Sheets

SEATBELT BUCKLE DETECTION

TECHNICAL FIELD

The subject matter of this disclosure relates in general to the field of a detection system, and more particularly, to systems and methods for detecting proper use of a seatbelt in a vehicle.

BACKGROUND

Autonomous vehicles (AVs) are vehicles having computers and control systems that perform driving and navigation tasks that are conventionally performed by a human driver. As AV technologies continue to advance, AVs will be required to perform many of the functions that are conventionally performed by human drivers, such as determining whether a seatbelt is fastened around a passenger's body or if the seatbelt is worn properly prior to initiating the operation and performing other safety checks necessary to provide safe transportation. Such tasks may require the collection and processing of large quantities of data using various sensors disposed on the AV.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which.

SUMMARY

Disclosed are systems, apparatuses, methods, computer-readable medium, and circuits for detecting a proper use of a seatbelt in a vehicle.

According to at least one example, a method includes receiving, from a sensor, image data of one or more portions of a seatbelt; determining, by a seatbelt safety system, a length of the seatbelt that is dispensed based on the image data; and determining, by the seatbelt safety system, if the seatbelt is buckled in front of a passenger's body based on the length of the seatbelt that is dispensed.

Furthermore, the method includes identifying, based on the image data, a pattern on the seatbelt wherein the pattern corresponds to a length measurement of the seatbelt. In some examples, the pattern on the seatbelt is retro-reflective.

In some examples, the method further includes determining the length of the seatbelt that is dispensed based on identifying a pattern of the surface of the seatbelt in the image data.

Furthermore, the method includes determining that the length of the seatbelt that is dispensed is below a threshold.

In some examples, to determine if the seatbelt is buckled in front of the passenger's body, the method further includes comparing, based on the image data, a length of a shoulder belt that is dispensed with a length of a lap belt that is dispensed.

In some instances, the seatbelt safety system comprises a machine-learning neural network.

In another example, a system for detecting a proper use of a seatbelt in a vehicle is provided that includes a sensor, wherein the sensor is configured to capture image data of one or more portions of a seatbelt, a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the system to receive the image data of the one or more portions of the seatbelt; determine a length of the seatbelt that is dispensed based on the image data; and determine if the seatbelt is buckled in front of a passenger's body based on the length of the seatbelt that is dispensed.

A non-transitory computer-readable storage medium having stored therein instructions which, when executed by one or more processors, can cause the one or more processors to receive, from a sensor, image data of one or more portions of a seatbelt; determine a length of the seatbelt that is dispensed based on the image data; and determine if the seatbelt is buckled in front of a passenger's body based on the length of the seatbelt that is dispensed.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Seatbelts (also known as safety belts) in a vehicle can help reduce the risk of injury in many types of crashes by properly positioning passengers. The U.S. National Highway Traffic Safety Administration (NHTSA) requires a passenger in vehicles to be buckled up properly to stay safe and secure inside the vehicles. However, improperly wearing a seatbelt, such as putting the strap belt below the arm or behind the body cannot adequately protect the passenger against harmful movement and may result in a critical or even fatal injury during a sudden stop of the vehicle or a collision. As such, a safety check to ensure that the seatbelt is properly fastened around the passenger's body is critical before initiating the operations of the vehicle.

Currently, some vehicles employ a buckle detection system with art individual sensor to detect whether a seatbelt is buckled properly. However, such an additional sensor cart be costly to implement and incapable of providing art absolute length of the seatbelt that is dispensed.

Aspects of the disclosed technology address the foregoing limitations by providing solutions for detecting misuse of a seatbelt in a vehicle, more specifically by utilizing an in-cabin sensor such as a camera disposed on the vehicle. Since an AV already has an in-cabin camera, proper or improper use of the seatbelt can be effectively detected by utilizing such camera.

DESCRIPTION

Figure 1:
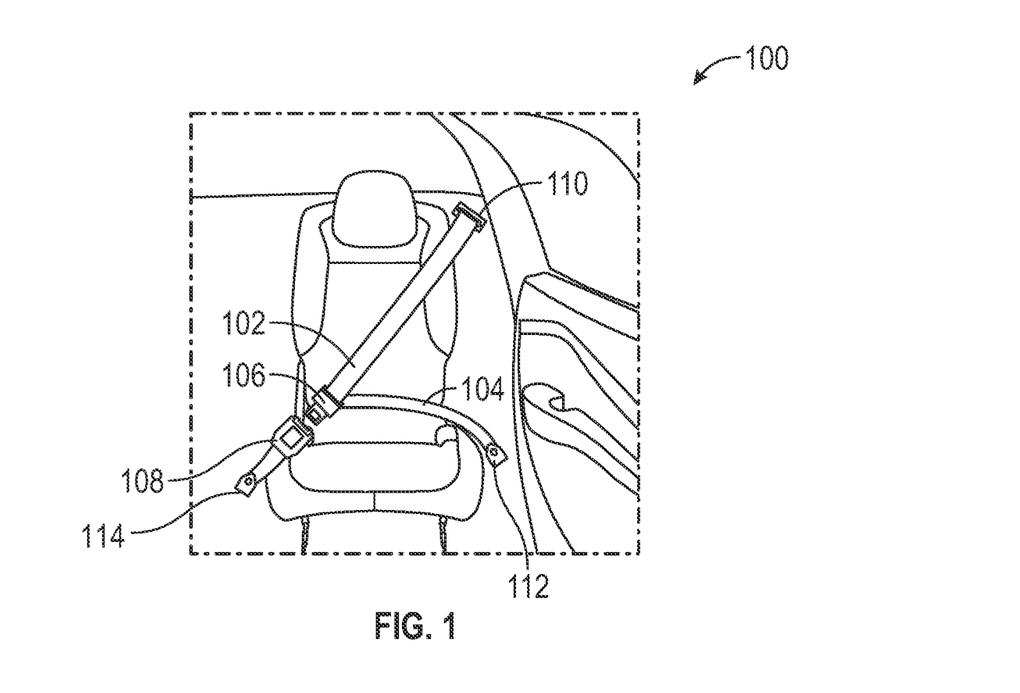
FIG. 1 illustrates an example seatbelt system in a vehicle according to some aspects of the disclosed technology.

FIG. 1 illustrates art example seatbelt system 100 in a vehicle according to some aspects of the present technology. According to some examples, seatbelt system 100 includes a three-point seatbelt, which comprises a shoulder belt (also known as sash belt or shoulder harness) 102 and a lap belt 104 as shown in FIG. 1. The "Y" shaped design of seatbelt system 100 (i.e., three-point seatbelt) can help restrain a passenger's upper body such as chest and shoulder. In some instances, shoulder belt 102 and lap belt 104 are pulled around the passenger and tightened to support the passenger. For example, shoulder belt 102 goes diagonally over the passenger's chest and shoulder and lap belt 104 goes over the waist.

In some examples, seatbelt system 100 includes tongue 106, which is attached to both shoulder belt 102 and lap belt 104 and fits into buckle 108 to secure seatbelt system 100. For example, buckle 108 may secure and release tongue 106, for example, where a passenger or an occupant of seatbelt system 100 inserts or removes tongue 106 into or from buckle 108.

In some instances, seatbelt system 100 can have three mounting positions (i.e., anchor points or anchorages), for example, upper anchor 110, lower anchor 112, and buckle anchor 114. In some examples, upper anchor 110 and lower anchor 112 may incorporate a retractor mechanism, which winds or retracts shoulder belt 102 or lap belt 104. This locking retractor mechanism may self-adjust shoulder belt 102 and lap belt 104 to the size of the occupant. Under normal driving conditions, the locking retractor mechanism allows the occupant to move freely relative to the seat, but locks shoulder belt 102 and lap belt 104 when the vehicle is rapidly stopped or in a collision so that shoulder belt 102 and lap belt 104, which fits across the lap and diagonally over the chest prevents the body of the occupant being thrown forward.

Although not shown in FIG. 1, a seatbelt safety system for detecting a proper or improper use of a seatbelt in a vehicle (e.g., seatbelt system 100) may include a sensor such as a camera, disposed on the vehicle. In some examples, the sensor may capture image data of some portions of the seatbelt (e.g., seatbelt system 100) when occupied by a passenger.

Figure 2A:
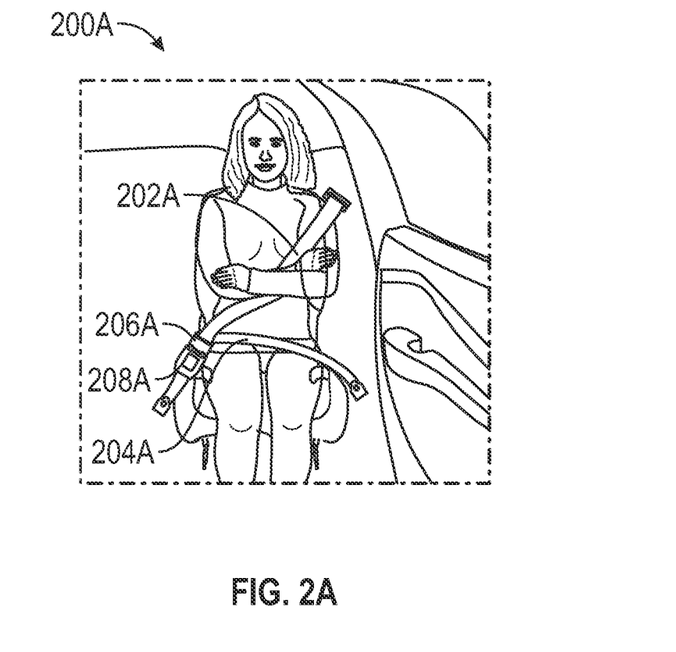
FIGS. 2A-2C illustrate an example seatbelt system where a passenger is properly and improperly buckled in, respectively, according to some aspects of the disclosed technology.
Figure 2B:
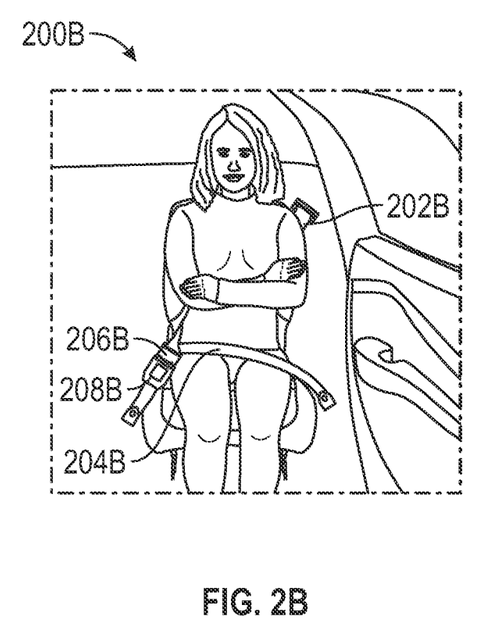

FIGS. 2A and 2B illustrate an example seatbelt system where a passenger is properly or improperly buckled in, respectively, according to some aspects of the disclosed technology.

FIG. 2A illustrates an example seatbelt system 200A properly fastened about an occupant. When seatbelt system 200A is properly installed (i.e., properly buckled via tongue 206A and buckle 208A), shoulder belt 202A and lap belt 204A are secured across the chest (or rib cage) and pelvis of the passenger as shown in FIG. 2A. For example, shoulder belt 202A is placed across the middle of the chest and lap belt 204A rests across the waist.

FIG. 2B illustrates an example seatbelt system 200B improperly fastened about an occupant. In some examples, seatbelt system 200B may be misused, even though shoulder belt 202B and lap belt 204B are properly buckled in via tongue 206B and buckle 208B, when shoulder belt 202B is behind the occupant's upper body (e.g., when the occupant puts shoulder belt 202B over the head and keeps shoulder belt 202B behind the occupant's torso). Such misuse of seatbelt system 200B may be incapable of securing and resisting the upper part of the occupant's body being pulled forward.

Figure 2C:
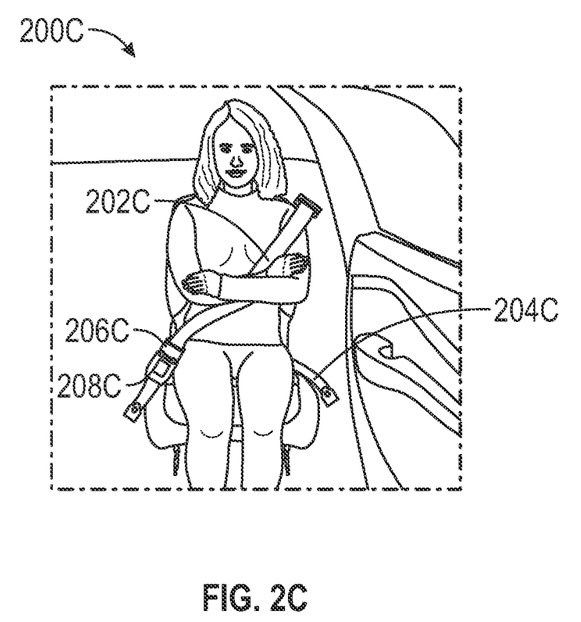

FIG. 2C illustrates another example seatbelt system 200C improperly fastened about an occupant. In some examples, seatbelt system 200C may be misused, even though shoulder belt 202C and lap belt 204C are properly buckled in via tongue 206C and buckle 208C, when lap belt 204C is behind the occupant's lower body (e.g., when the occupant puts lap belt 204C behind the occupant's lower body or sits on lap belt 204C).

Figure 3:
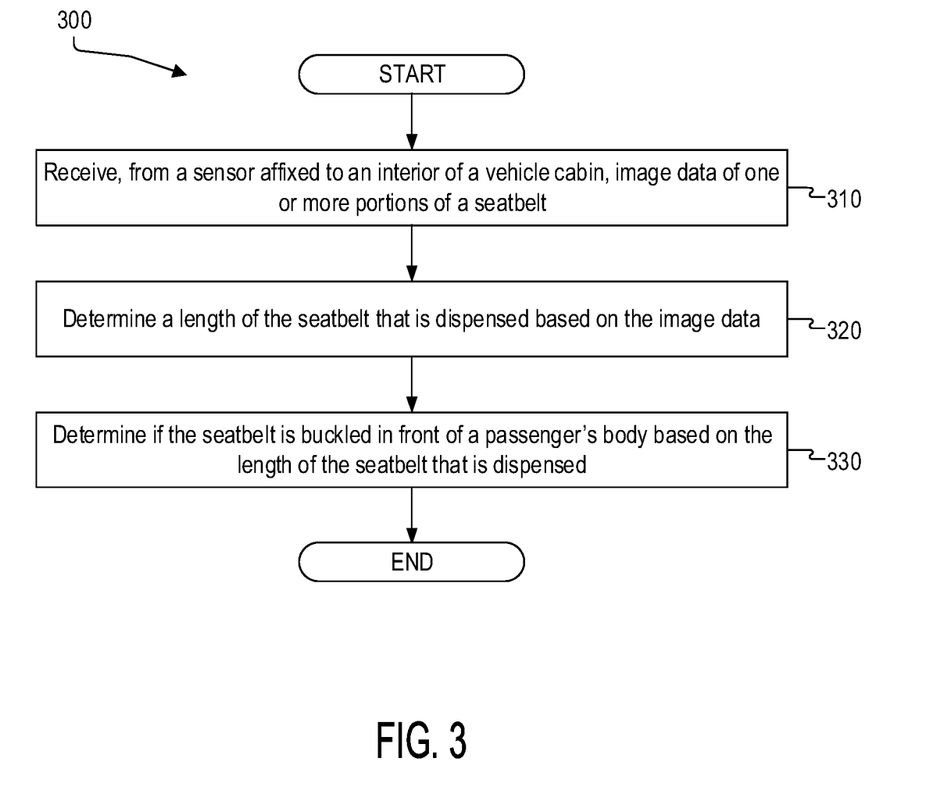
FIG. 3 is a flowchart of a method for detecting misuse of a seatbelt in a vehicle according to some aspects of the disclosed technology.

FIG. 3 a flowchart of a method 300 for detecting misuse of a seatbelt in a vehicle according to some aspects of the disclosed technology. Although example method 300 depicts a particular sequence of operations, the sequence may be altered without departing from the scope of the present disclosure. For example, some of the operations depicted may be performed in parallel or in a different sequence that does not materially affect the function of method 300. In other examples, different components of an example device or system that implements method 300 may perform functions at substantially the same time or in a specific sequence.

According to some examples, method 300 includes receiving image data of one or more portions of the seatbelt from a sensor (e.g., in-cabin camera) at step 310. In some examples, the sensor is affixed to an interior of a vehicle cabin. Furthermore, the sensor may be configured to capture image data of one or more portions of a seatbelt (e.g., seatbelt system 100 illustrated in FIG. 1).

In some examples, the one or more portions of the seatbelt captured by the sensor can show a buckle (e.g., buckle 108 in FIGS. 1, 2A, and 2B) and an area adjacent to the buckle. For example, the image data of the one or more portions of the seatbelt (e.g., seatbelt system 100) may correspond to a portion adjacent to a buckle of the seatbelt (e.g., buckle 108).

At step 320, method 300 includes determining a length of the seatbelt that is dispensed based on the image data. For example, based on the image data received from the sensor, a length of the seatbelt, such as shoulder belt 102 and lap belt 104, that is dispensed can be determined. When buckled, the length of the shoulder belt that is dispensed can be measured as a length between an upper anchorage point (e.g., upper anchor 110) and the buckle (e.g., buckle 108). Also, the length of the lap belt that is dispensed can be measured as a length between a lower anchorage point (e.g., lower anchor 112) and an anchorage point that holds a buckle (e.g., buckle anchor 114).

In some instances, three anchorage points such as upper anchor 110, lower anchor 112, and buckle anchor 114 are mounted/fixed on the vehicle. Also, shoulder belt 102 and lap belt 104 are dispensed from upper anchor 110 and lower anchor 112, respectively, to buckle 108. As such, the length of the shoulder belt and/or lap belt that is dispensed may vary depending on the size of the occupant (i.e., passenger). The image data of some portions of the seatbelt (e.g., seatbelt system 100) captured by the sensor can provide measurement information where the dispensed length of the seatbelt such as shoulder belt 102 and lap belt 104 can be determined.

At step 330, method 300 includes determining if the seatbelt is buckled in front of a passenger's body based on the length of the seatbelt that is dispensed.

According to some examples, method 300 can further include identifying, based on the image data, a pattern on the seatbelt wherein the pattern corresponds to a length measurement of the seatbelt. In some examples, a pattern on the seatbelt including the shoulder belt (e.g., shoulder belt 102) and/or lap belt (e.g., lap belt 104) can indicate a length measurement of the seatbelt. For example, the pattern on the seatbelt can be a ruler, a measuring strip, or any type of pattern that can indicate the length.

In some examples, the pattern can be a gradual color gradient, for example, from red, orange, yellow, green, blue, indigo, to violet so that depending on the color shown, the length of the belt that has been dispensed can be determined. In some instances, the pattern can be two lines that start at the top and bottom of the belt and gradually come together at the other end of the belt. In this case, based on the distance between the two lines, how far the belt is dispensed can be determined. In some examples, the pattern can be a repetition of certain words where each repetition is offset by a set distance. Based on the letter shown, the distance from the top, the length of the belt that is dispensed can be determined. A unique pattern integrated into the seatbelt can help detect the pattern on the seatbelt and determine the length measurement of the seatbelt that is dispensed.

According to some examples, the pattern can be retro-reflective. For example, a retro-reflective pattern can be integrated into the seatbelt webbing throughout some portions or the entire length of the seatbelt. In some examples, a portion of the seatbelt to identify or determine the dispensed length of the seatbelt may be obstructed, for example, because of the occupant's clothing, long hair, bag, or any item placed on the passenger's lap. In such case, the length measurement on the image data cannot be easily determined due to the blocked view of the seatbelt. In some examples, the retro-reflective pattern can be used on the seatbelt, which may help identify the length measurement of the seatbelt on the image data.

According to some examples, the seatbelt, more specifically, seatbelt webbing can be made of an infrared (IR) emitting material. For example, an IR emitting material can be integrated into the material of the seatbelt webbing throughout some portions or the entire length of the seatbelt. In some instances, the pattern of the IR thread, which may be invisible but can be captured in the image data can help determine the length measurement of the seatbelt.

According to some examples, method 300 can further include determining the length of the seatbelt that is dispensed based on identifying a pattern of the surface of the seatbelt in the image data. As previously described, the pattern on the seatbelt can incorporate a measuring mechanism such as a ruler, measuring strip, gradient, etc. to help determine the length of the seatbelt that is dispensed when buckled.

According to some examples, method 300 can further include comparing, based on the image data, a length of a shoulder belt that is dispensed with a length of a lap belt that is dispensed. For example, the length of shoulder belt 102 that is dispensed can be compared with the length of lap belt 104 can be compared to determine whether shoulder belt 102 is worn improperly (e.g., whether shoulder belt 102 is placed behind the passenger's body and not across the passenger's chest). Since two anchorage points placed on the right and left side of the passenger's hips, lower anchor 112 and buckle anchor 114 are fixed once seatbelt system 100 is secured with buckle 108, the length of lap belt 104 that is dispensed, i.e., the distance between lower anchor 112 and buckle 108 can be determined based on the image data of seatbelt system 100 captured by the sensor.

In some instances, based on the length of lap belt 104 that is dispensed, the size of the passenger can be approximately determined, which then can provide an estimated length of shoulder belt 102 that is to be dispensed when seatbelt system 100 is properly secured, in other words, when shoulder belt 102 is placed diagonally across the passenger's upper body.

According to some examples, method 300 can further include determining that the length of the seatbelt that is dispensed is below a threshold. In some examples, based on the length of the lap belt that is dispensed (i.e., distance between the lower anchorage point and the buckle, when the seatbelt system is secured about the occupant), a length of the shoulder belt that is expected to be dispensed can be determined. Such the expected length of the shoulder belt to be dispensed can be determined as a threshold. When the length of the shoulder belt that is actually dispensed is below the threshold, then misuse of the seatbelt can be determined.

According to some examples, the seatbelt safety system can utilize a machine learning neural network. For example, machine learning can be leveraged to improve the overall detection of the pattern on the seatbelt.

While method 300 is described with reference to a three-point seatbelt system (e.g., seatbelt system 100 as illustrated in FIG. 1) since the three-point seatbelt system is most commonly used in vehicles, any multi-point seatbelt system that includes a combination of a shoulder belt and a lap belt can be used in a similar fashion.

Figure 4:
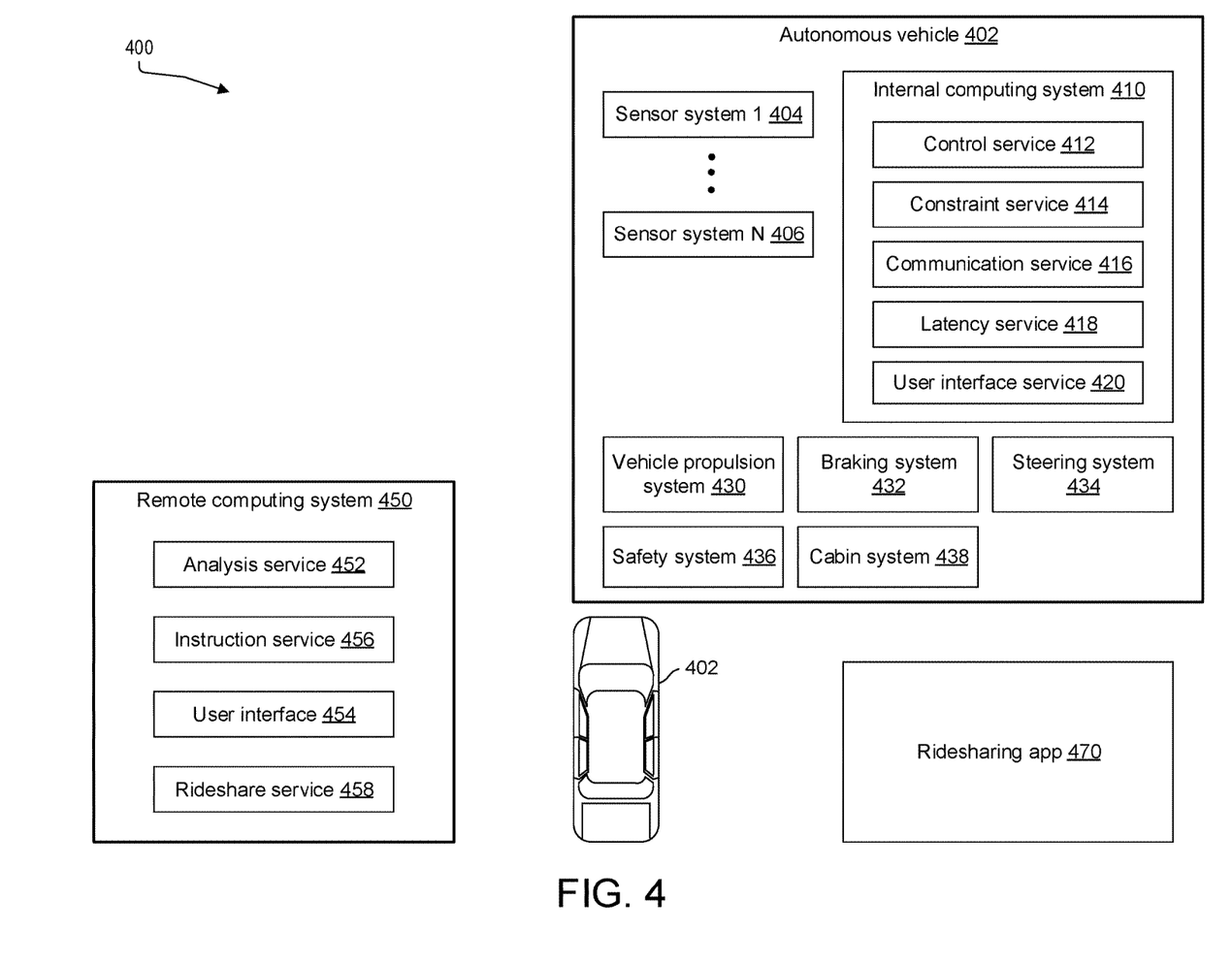
FIG. 4 illustrates an example autonomous vehicle environment including a computing system in communication with an autonomous vehicle, in accordance with some examples.

FIG. 4 illustrates environment 400 that includes an autonomous vehicle 402 in communication with a remote computing system 450 where a seatbelt safety system of the present disclosure cart be implemented.

The autonomous vehicle 402 cart navigate about roadways without a human driver based upon sensor signals output by sensor systems 404-406 of the autonomous vehicle 402. The autonomous vehicle 402 includes a plurality of sensor systems 404-406 (a first sensor system 404 through an Nth sensor system 406). The sensor systems 404-406 are of different types and are arranged about the autonomous vehicle 402. For example, the first sensor system 404 may be a camera sensor system and the Nth sensor system 406 may be a lidar sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 402 further includes several mechanical systems that are used to effectuate appropriate motion of the autonomous vehicle 402. For instance, the mechanical systems can include but are not limited to, a vehicle propulsion system 430, a braking system 432, and a steering system 434. The vehicle propulsion system 430 may include an electric motor, an internal combustion engine, or both. The braking system 432 can include an engine brake, brake pads, actuators, and/or any other suitable componentry that is configured to assist in decelerating the autonomous vehicle 402. The steering system 434 includes suitable componentry that is configured to control the direction of movement of the autonomous vehicle 402 during navigation.

The autonomous vehicle 402 further includes a safety system 436 that can include various lights and signal indicators, parking brake, airbags, etc. The autonomous vehicle 402 further includes a cabin system 438 that can include cabin temperature control systems, in-cabin entertainment systems, etc.

The autonomous vehicle 402 additionally comprises an internal computing system 410 that is in communication with the sensor systems 404-406 and the mechanical systems 430, 432, 434. The internal computing system includes at least one processor and at least one memory having computer-executable instructions that are executed by the processor. The computer-executable instructions can make up one or more services responsible for controlling the autonomous vehicle 402, communicating with remote computing system 450, receiving inputs from passengers or human co-pilots, logging metrics regarding data collected by sensor systems 404-406 and human co-pilots, etc.

The internal computing system 410 can include a control service 412 that is configured to control operation of the vehicle propulsion system 430, the braking system 432, the steering system 434, the safety system 436, and the cabin system 438. The control service 412 receives sensor signals from the sensor systems 402-404 as well communicates with other services of the internal computing system 410 to effectuate operation of the autonomous vehicle 402. In some embodiments, control service 412 may carry out operations in concert one or more other systems of autonomous vehicle 402.

The internal computing system 410 can also include a constraint service 414 to facilitate safe propulsion of the autonomous vehicle 402. The constraint service 414 includes instructions for activating a constraint based on a rule-based restriction upon operation of the autonomous vehicle 402. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 412.

The internal computing system 410 can also include a communication service 416. The communication service can include both software and hardware elements for transmitting and receiving signals from/to the remote computing system 450. The communication service 416 is configured to transmit information wirelessly over a network, for example, through an antenna array that provides personal cellular (long-term evolution (LTE), 3G, 5G, etc.) communication.

In some embodiments, one or more services of the internal computing system 410 are configured to send and receive communications to remote computing system 450 for such reasons as reporting data for training and evaluating machine learning algorithms, requesting assistance from remoting computing system or a human operator via remote computing system, software service updates, ridesharing pickup and drop off instructions etc.

The internal computing system 410 can also include a latency service 418. The latency service 418 can utilize timestamps on communications to and from the remote computing system 450 to determine if a communication has been received from the remote computing system 450 in time to be useful. For example, when a service of the internal computing system 410 requests feedback from remote computing system 450 on a time-sensitive process, the latency service 418 can determine if a response was timely received from remote computing system 450 as information can quickly become too stale to be actionable. When the latency service 418 determines that a response has not been received within a threshold, the latency service 418 can enable other systems of autonomous vehicle 402 or a passenger to make necessary decisions or to provide the needed feedback.

The internal computing system 410 can also include a user interface service 420 that can communicate with cabin system 438 in order to provide information or receive information to a human co-pilot or human passenger. In some embodiments, a human co-pilot or human passenger may be required to evaluate and override a constraint from constraint service 414, or the human co-pilot or human passenger may wish to provide an instruction to the autonomous vehicle 402 regarding destinations, requested routes, or other requested operations.

As described above, the remote computing system 450 is configured to send/receive a signal from the autonomous vehicle 402 regarding reporting data for training and evaluating machine learning algorithms, requesting assistance from remoting computing system or a human operator via the remote computing system 450, software service updates, ridesharing pickup and drop off instructions, etc.

The remote computing system 450 includes an analysis service 452 that is configured to receive data from autonomous vehicle 402 and analyze the data to train or evaluate machine learning algorithms for operating the autonomous vehicle 402. The analysis service 452 can also perform analysis pertaining to data associated with one or more errors or constraints reported by autonomous vehicle 402.

The remote computing system 450 can also include a user interface service 454 configured to present metrics, video, pictures, sounds reported from the autonomous vehicle 402 to an operator of remote computing system 450. User interface service 454 can further receive input instructions from an operator that can be sent to the autonomous vehicle 402.

The remote computing system 450 can also include an instruction service 456 for sending instructions regarding the operation of the autonomous vehicle 402. For example, in response to an output of the analysis service 452 or user interface service 454, instruction service 456 can prepare instructions to one or more services of the autonomous vehicle 402 or a co-pilot or passenger of the autonomous vehicle 402.

The remote computing system 450 can also include a rideshare service 458 configured to interact with ridesharing applications 470 operating on (potential) passenger computing devices. The rideshare service 458 can receive requests to be picked up or dropped off from passenger ridesharing app 470 and can dispatch autonomous vehicle 402 for the trip. The rideshare service 458 can also act as an intermediary between the ridesharing app 470 and the autonomous vehicle wherein a passenger might provide instructions to the autonomous vehicle to 402 go around an obstacle, change routes, honk the horn, etc.

Figure 5:
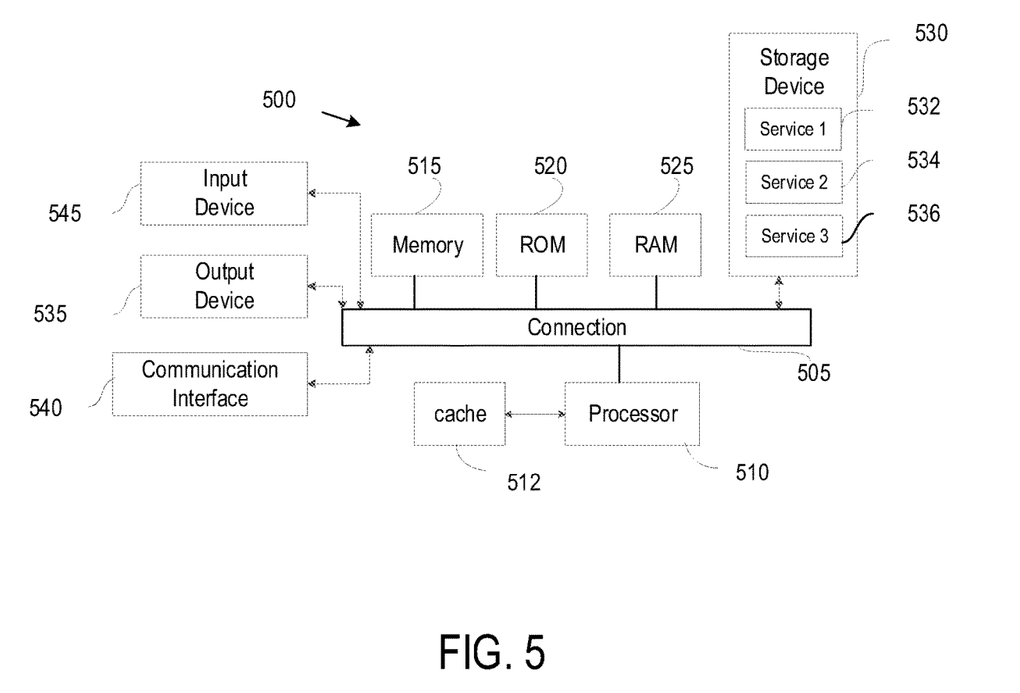
FIG. 5 shows an example of a computing system for implementing certain aspects of the present technology.

FIG. 5 shows an example of computing system 500, which can be for example any computing device making up a seatbelt safety system of the present disclosure, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communication interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 5 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on arty particular hardware arrangement, and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models cart also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and cart additionally include items not listed in the set of A and B.

What is claimed is:

1. A seatbelt safety system comprising:
   a sensor, wherein the sensor is configured to capture image data of one or more portions of a seatbelt;
   one or more processors coupled to the sensor; and
   a computer-readable medium comprising instructions stored therein, which when executed by the one or more processors, cause the one or more processors to:
   receive the image data of the one or more portions of the seatbelt;
   determine a length of the seatbelt that is dispensed based on the image data; and
   determine if the seatbelt is buckled in front of a passenger's body based on comparing a length of a shoulder belt that is dispensed with a length of a lap belt that is dispensed.

2. The seatbelt safety system of claim 1, further comprising instructions, which when executed by the one or more processors, cause the one or more processors to:

identify, based on the image data, a pattern on the seatbelt wherein the pattern corresponds to a length measurement of the seatbelt.

3. The seatbelt safety system of claim 2, wherein the pattern is retro-reflective.

4. The seatbelt safety system of claim 2, wherein the pattern is an infrared emitting material.

5. The seatbelt safety system of claim 1, further comprising instructions, which when executed by the one or more processors, cause the one or more processors to:
determine the length of the seatbelt that is dispensed based on identifying a pattern of a surface of the seatbelt in the image data.

6. The seatbelt safety system of claim 1, further comprising instructions, which when executed by the one or more processors, cause the one or more processors to:
determine that the length of the seatbelt that is dispensed is below a threshold.

7. The seatbelt safety system of claim 1, wherein the seatbelt safety system is a machine learning neural network.

8. A method comprising:
receiving, from a sensor, image data of one or more portions of a seatbelt;
determining, by a seatbelt safety system, a length of the seatbelt that is dispensed based on the image data; and
determining, by the seatbelt safety system, if the seatbelt is buckled in front of a passenger's body based on comparing a length of a shoulder belt that is dispensed with a length of a lap belt that is dispensed.

9. The method of claim 8, further comprising:
identifying, based on the image data, a pattern on the seatbelt wherein the pattern corresponds to a length measurement of the seatbelt.

10. The method of claim 9, wherein the pattern is retro-reflective.

11. The method of claim 9, wherein the pattern is an infrared emitting material.

12. The method of claim 8, further comprising:
determining the length of the seatbelt that is dispensed based on identifying a pattern of a surface of the seatbelt in the image data.

13. The method of claim 8, further comprising:
determining that the length of the seatbelt that is dispensed is below a threshold.

14. The method of claim 8, wherein the seatbelt safety system is a machine learning neural network.

15. A non-transitory computer-readable storage medium comprising computer-readable instructions, which when executed by one or more processors, cause the one or more processors to:
receive, from a sensor, image data of one or more portions of a seatbelt;
determine, by a seatbelt safety system, a length of the seatbelt that is dispensed based on the image data; and
determine, by the seatbelt safety system, if the seatbelt is buckled in front of a passenger's body based on comparing a length of a shoulder belt that is dispensed with a length of a lap belt that is dispensed.

16. The non-transitory computer-readable storage medium of claim 15, further comprising instructions, which when executed by the one or more processors, cause the one or more processors to:
identify, based on the image data, a pattern on the seatbelt wherein the pattern corresponds to a length measurement of the seatbelt.

17. The non-transitory computer-readable storage medium of claim 16, wherein the pattern is retro-reflective.

18. The non-transitory computer-readable storage medium of claim 16, wherein the pattern is an infrared emitting material.

19. The non-transitory computer-readable storage medium of claim 15, further comprising instructions, which when executed by the one or more processors, cause the one or more processors to:
determine that the length of the seatbelt that is dispensed is below a threshold.

20. The non-transitory computer-readable storage medium of claim 15, wherein the seatbelt safety system is a machine learning neural network.

* * * * *